United States Patent
Morihisa

(10) Patent No.: US 9,507,986 B2
(45) Date of Patent: Nov. 29, 2016

(54) IMAGING SYSTEM

(71) Applicant: Taijiroh Morihisa, Kanagawa (JP)

(72) Inventor: Taijiroh Morihisa, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 14/621,619

(22) Filed: Feb. 13, 2015

(65) Prior Publication Data

US 2015/0261987 A1 Sep. 17, 2015

(30) Foreign Application Priority Data

Mar. 14, 2014 (JP) .................. 2014-052791

(51) Int. Cl.
*G06K 7/10* (2006.01)
*G02B 27/00* (2006.01)
*G06K 7/12* (2006.01)

(52) U.S. Cl.
CPC ....... *G06K 7/10732* (2013.01); *G02B 27/0075* (2013.01); *G06K 7/10544* (2013.01); *G06K 7/10752* (2013.01); *G06K 7/10801* (2013.01); *G06K 7/10811* (2013.01); *G06K 7/12* (2013.01)

(58) Field of Classification Search
USPC ............... 235/455; 359/739; 348/340, 349
See application file for complete search history.

(56) References Cited

U.S. PATENT DOCUMENTS 3,785,812 A * 1/1974 Matsumoto .......... G03G 15/011
                                                                                                             359/599
8,149,319 B2    4/2012   Robinson
8,248,511 B2    8/2012   Robinson et al.
(Continued)

FOREIGN PATENT DOCUMENTS

| JP | 2009-140496 | 6/2009 |
|---|---|---|
| JP | 2011-078097 | 4/2011 |
| JP | 2011-193190 | 9/2011 |

OTHER PUBLICATIONS

Extended European Search Report issued on Jul. 16, 2015 in European Patent Application No. 15157848.1.

(Continued)

*Primary Examiner* — Allyson Trail
(74) *Attorney, Agent, or Firm* — Oblon, McClelland, Maier & Neustadt, L.L.P.

(57) ABSTRACT

An imaging system includes an optical system, an optical element, a lighting, and an imaging device. The optical system has different focus positions for different wavelengths of light. The optical element extends depth of field of the optical system. The lighting irradiates an object with illumination light of a wavelength that is designated from among multiple wavelengths. The imaging device captures an image of the object that is irradiated with the illumination light and is formed by the optical system.

20 Claims, 4 Drawing Sheets

(56) References Cited

U.S. PATENT DOCUMENTS

| | | | |
|---|---|---|---|
| 2002/0171820 A1* | 11/2002 | Okamura | H04N 1/4076 355/133 |
| 2006/0014099 A1* | 1/2006 | Faler | C08G 18/672 430/270.1 |
| 2006/0171041 A1 | 8/2006 | Olmstead et al. | |
| 2008/0158377 A1 | 7/2008 | Chanas et al. | |
| 2008/0212168 A1 | 9/2008 | Olmstead et al. | |
| 2010/0002095 A1 | 1/2010 | Nagao et al. | |
| 2011/0019065 A1 | 1/2011 | Chanas et al. | |
| 2011/0074988 A1* | 3/2011 | Robinson | G02B 27/0075 348/273 |
| 2011/0109749 A1 | 5/2011 | Chanas et al. | |
| 2012/0019708 A1 | 1/2012 | Morihisa et al. | |
| 2012/0062780 A1 | 3/2012 | Morihisa | |
| 2012/0307133 A1* | 12/2012 | Gao | G02B 27/0075 348/349 |
| 2013/0126618 A1 | 5/2013 | Gao | |
| 2014/0092275 A1 | 4/2014 | Morihisa | |
| 2015/0228815 A1* | 8/2015 | Tsai | H01L 31/02366 136/256 |

OTHER PUBLICATIONS

Christel-Loic Tisse, et al. "Extended depth-of-field (EDoF) using sharpness transport across colour channels", Proceedings of SPIE, SPIE—International Society for Optical Engineering, XP008122032, vol. 7061, Aug. 10, 2008, pp. 706105-1-706105-12.

* cited by examiner

FIG.6

| Surface Number | R | D | Nd | νd |
|---|---|---|---|---|
| 1 | -113.7622 | 1.200 | 1.72916 | 54.7 |
| 2 | 4.8648 | 6.235 | | |
| 3 | 14.1452 | 1.400 | 2.00178 | 19.32 |
| 4 | -157.2185 | 3.645 | | |
| 5 | Aperture | 0.202 | | |
| 6 | 49.8936 | 2.216 | 1.94595 | 17.98 |
| 7 | 7.0670 | 1.705 | 1.58313 | 59.4 |
| 8 | -9.8161 | 0.100 | | |
| 9 | 9.6526 | 1.252 | 1.95906 | 17.5 |
| 10 | 26.9350 | 1.000 | | |
| 11 | ∞ | 0.7 | 1.54437 | 70.7 |
| 12 | ∞ | 0.1 | | |
| 13 | ∞ | 0.7 | 1.50680 | 46.00 |
| 14 | ∞ | BF | | |

IMAGING SYSTEM

CROSS-REFERENCE TO RELATED APPLICATIONS

The present application claims priority to and incorporates by reference the entire contents of Japanese Patent Application No. 2014-052791 filed in Japan on Mar. 14, 2014.

BACKGROUND OF THE INVENTION

1. Field of the Invention

The present invention relates generally to an imaging system.

2. Description of the Related Art

There is known imagers for reading codes such as barcodes and characters or symbols and including an image sensor such as a charge coupled device (CCD) or a complementary metal-oxide semiconductor (CMOS). One known type of such imagers is an imager that utilizes an optical system having, due to axial chromatic aberrations, different focus positions for different wavelengths of light to provide a large depth of field, thereby providing a large readable range. An example of such an imager is disclosed in Japanese Laid-open Patent Application No. 2011-078097.

However, such conventional imagers are disadvantageous in that, in a situation where brightness of an object varies depending on the wavelength of light, depth of field cannot be extended effectively. This is because, in such a situation, contrast varies considerably depending on the wavelength of light.

Therefore, there is a need for an imaging system capable of efficiently extending depth of field.

SUMMARY OF THE INVENTION

According to an embodiment, an imaging system includes an optical system, an optical element, a lighting, and an imaging device. The optical system has different focus positions for different wavelengths of light. The optical element extends depth of field of the optical system. The lighting irradiates an object with illumination light of a wavelength that is designated from among multiple wavelengths. The imaging device captures an image of the object that is irradiated with the illumination light and is formed by the optical system.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 6 is a diagram illustrating an example of lens data obtained using the lens unit illustrated in FIG. 5;

DETAILED DESCRIPTION OF THE PREFERRED EMBODIMENTS

Exemplary embodiments are described in detail below with reference to the accompanying drawings.

Figure 1:
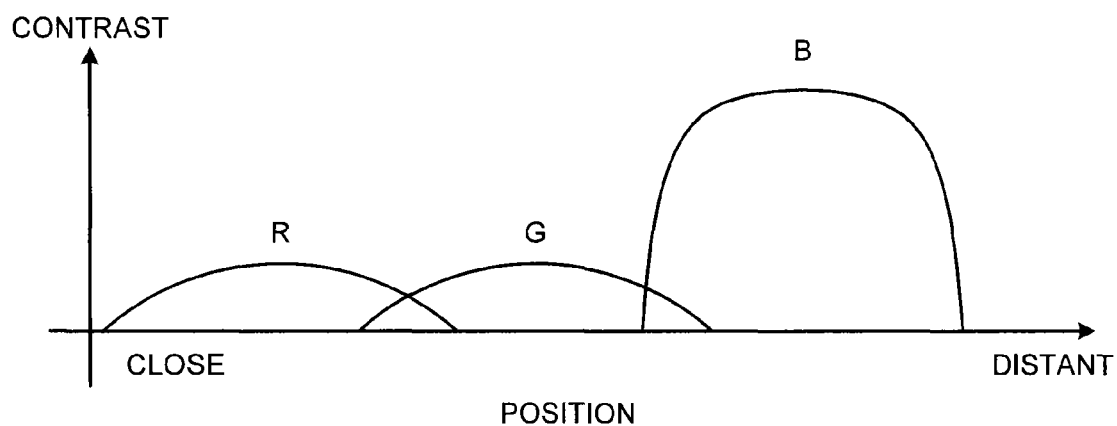
FIG. 1 is a diagram illustrating relationship between imager-to-object distance and contrast at each wavelength.
Figure 2:
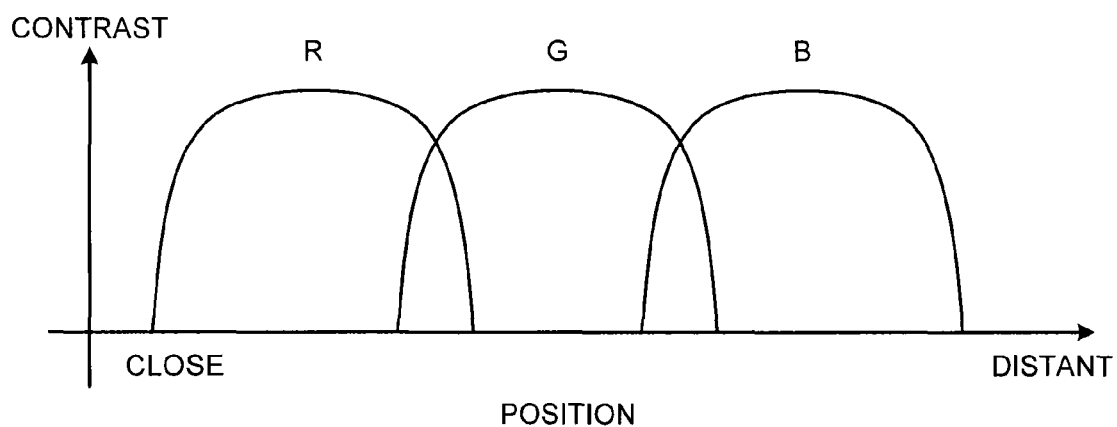
FIG. 2 is a diagram illustrating relationship between imager-to-object distance and contrast at each wavelength.
Figure 3:
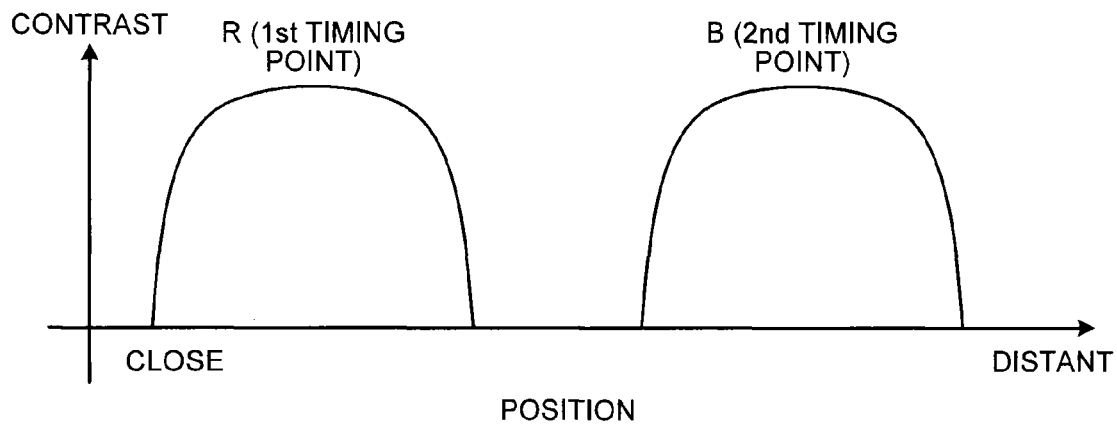
FIG. 3 is a diagram illustrating relationship between imager-to-object distance and contrast at each wavelength.

Relationship between depth of field and contrast is described first. FIGS. 1 to 3 are diagrams each illustrating relationship between imager-to-object distance and contrast at each wavelength.

To extend depth of field of an imager (imaging system) that utilizes an optical system having different focus positions for different wavelengths of light, it is desirable that such relationship as that illustrated in FIG. 2 holds between contrast and position. However, contrast can vary at different wavelengths (for example, among R (red), G (green), and B (blue) wavelengths) as in image capture using natural light; in that case, a certain wavelength (in the example illustrated in FIG. 1, the R and G wavelengths) can yield low contrast. In this case, even though different wavelengths are used, effective extension of depth of field is not achieved.

Under the circumstances, the imaging system according to the embodiment extends depth of field efficiently by using a lighting capable of emitting illumination light of one or more wavelengths designated (selected) from among multiple wavelengths. "Extending depth of field" as used herein means making focus position controllable in a wide range.

For example, as illustrated in FIG. 2, control may be implemented so as to cause the R, G, and B wavelengths to overlap, thereby extending the overall depth of field as illustrated in FIG. 2. For another example, in a situation where the position of an object is known, control may be implemented in the following manner as illustrated in FIG. 3. At a first timing point, an object positioned close to the imager is irradiated with an appropriate amount of R illumination light, and at a second timing point, an object positioned distant from the imager is irradiated with an appropriate amount of B illumination light.

Figure 4:
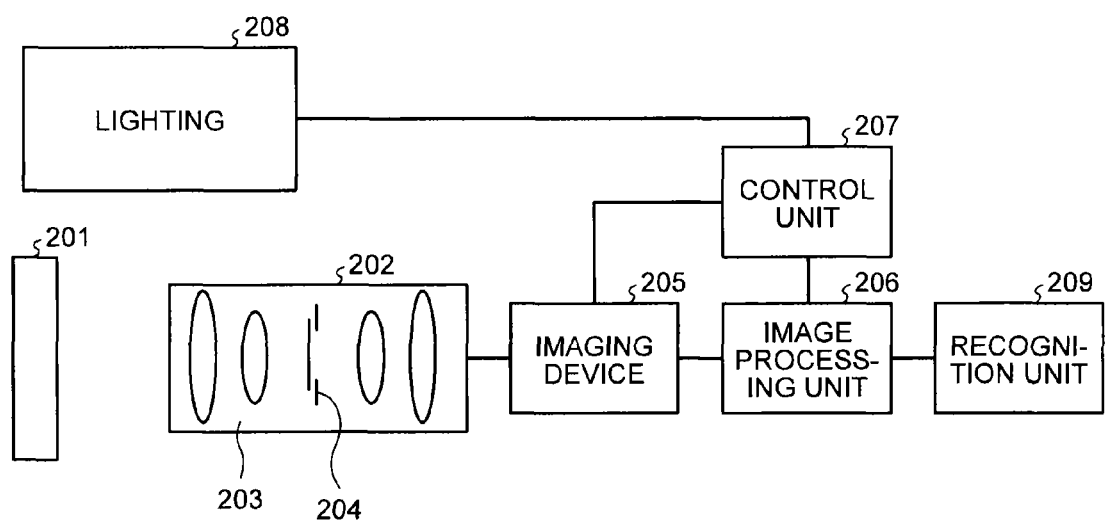
FIG. 4 is a block diagram illustrating an example configuration of an imaging system according to an embodiment.

FIG. 4 is a block diagram illustrating an example configuration of the imaging system according to the embodiment. As illustrated in FIG. 4, the imaging system includes a lens unit 202, an imaging device 205, an image processing unit 206, a control unit 207, a lighting 208, and a recognition unit 209. The imaging system may be implemented as an imager including the units in a single casing, for example. Alternatively, the imaging system may be implemented by multiple devices including the units in a distributed manner and communicably connected to each other over a network or the like.

The imaging system captures an image of an object 201 using the units described above. Examples of the object 201 include barcodes, two-dimensional codes, and character strings. The imaging system is usable as an imager for reading these codes and characters.

The lens unit 202 is an optical system including one or more lenses and having different focus positions for different wavelengths. More specifically, by making use of chromatic aberration, the lens unit 202 focuses different wavelengths on axially separated image planes rather than focusing all the wavelengths on a single image plane. The lens unit 202 includes a phase plate 203 and an aperture 204.

The phase plate 203 is arranged near the aperture 204. The phase plate 203 is an example optical element for producing aberration to extend depth of field. The phase plate 203 can spread the point spread function (PSF) on an image surface of the imaging device 205 over two or more pixels.

The lens unit 202 forms an aberrated image of the object 201 on the image surface of the imaging device 205. The phase plate 203 may be configured to be detachable. The lens unit 202, from which the phase plate 203 is removed, is usable as an ordinary optical system. In the embodiment, aberration for extending the depth of field are produced using the phase plate 203; however, approach for producing aberration is not limited to that using the phase plate 203. For example, a configuration in which the entire lens unit 202 produces the aberration for extending the depth of field may be employed.

Figure 5:
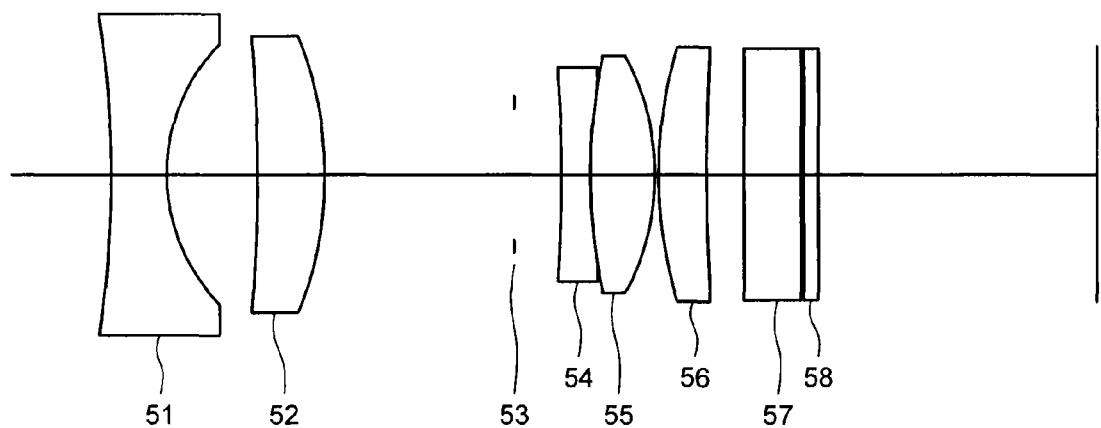
FIG. 5 is a diagram illustrating an example configuration of a lens unit having axial chromatic aberrations which cause the focus position to vary with wavelength.

FIG. 5 is a diagram illustrating an example configuration of a lens unit having axial chromatic aberration which cause the focus position to vary with wavelength. FIG. 6 is a diagram illustrating an example of lens data obtained using the lens unit illustrated in FIG. 5.

The lens unit illustrated in FIG. 5 includes lenses 51 and 52, an aperture 53, and lenses 54 to 58. The focal length f, the F number Fno, and the half angle of view ω of the entire system of the lens unit illustrated in FIG. 5 are as follows: f=5.26, Fno=2.8, and ω=33.6. The surface number in FIG. 6 is the ordinal number (counted from the lens 51) of the surface. R, D, Nd, and vd denote the radius of curvature (or, if the surface is aspheric, the paraxial radius of curvature), surface-to-surface spacing, the refractive index, and the Abbe number, respectively.

Referring back to FIG. 4, the imaging device 205 captures an image, which is formed by the lens unit 202, of the object 201 irradiated with illumination light emitted from the lighting 208. The imaging device 205 may be a monochrome imaging device, for example. As the imaging device 205, for example, a general solid-state imaging device such as a charge coupled device (CCD) or complementary metal oxide semiconductor (CMOS) sensor can be used. The imaging device 205 outputs image data. The thus-output image data is fed to the image processing unit 206.

The image processing unit 206 applies image processing to the image captured by the imaging device 205. For instance, the image processing unit 206 may apply, when the phase plate 203 is included in the lens unit 202, processing (hereinafter, "PSF deconvolution") for deconvoluting the PSF spread by the phase plate 203. The image processing unit 206 may switch image processing from one to another in accordance with the wavelength of the emitted illumination light. For example, the image processing unit 206 may apply one PSF deconvolution process, which is associated with the wavelength of the emitted illumination light, of multiple PSF deconvolution processes respectively associated with multiple wavelengths.

The recognition unit 209 recognizes (detects) various codes such as one-dimensional barcodes and two-dimensional barcodes, symbols such as characters, and the like in the image-processed image.

The lighting 208 irradiates the object 201 with illumination light of one or more wavelengths designated from among the multiple wavelengths. For example, the lighting 208 may emit illumination light of one or more wavelengths designated by the control unit 207.

The control unit 207 controls overall processing of the imaging system. For example, the control unit 207 may control the lighting 208 so that switching of the wavelength of the illumination light emitted from the lighting 208 is timed to, for example, reading by the imaging device 205. The control unit 207 may cause the image processing unit 206 to apply a PSF deconvolution process in accordance with switching of the illumination light.

The image processing unit 206, the control unit 207, and the recognition unit 209 may be implemented in software using a CPU (central processing unit) or the like or, alternatively, may be implemented in hardware using an integrated circuit such as an FPGA (field-programmable gate array) or, further alternatively, may be implemented in a combination of software and hardware.

Figure 7:
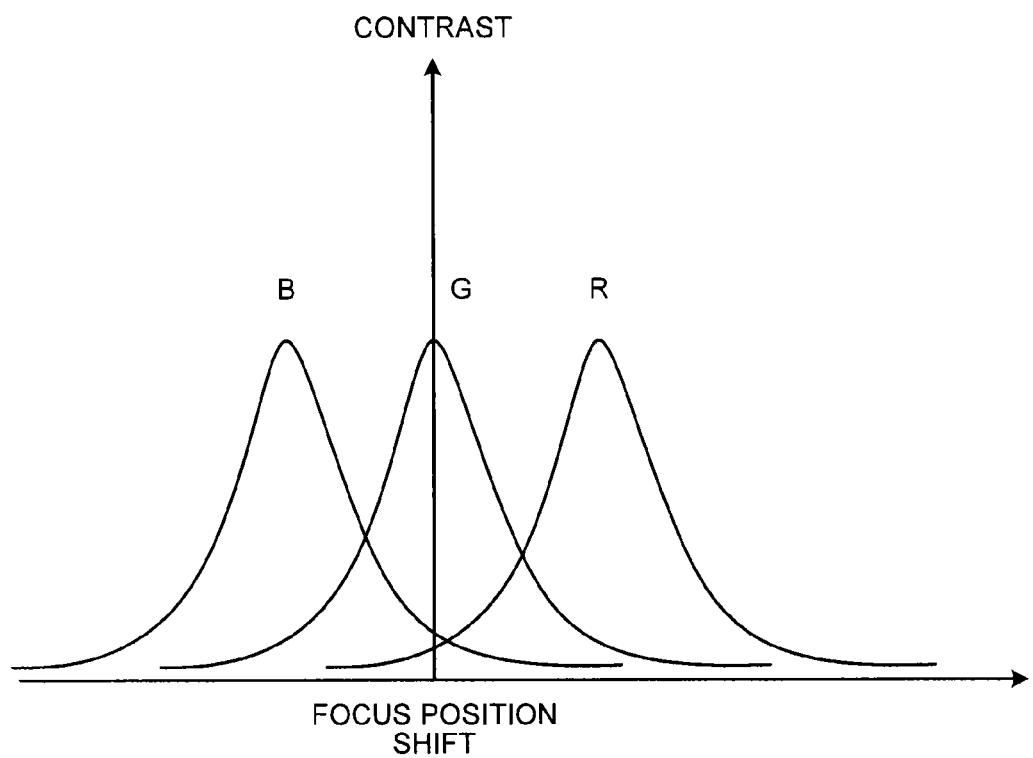
FIG. 7 is a diagram illustrating an example of wavelength-dependent focus position shift.

FIG. 7 is a diagram illustrating an example of wavelength-dependent focus position shift. FIG. 7 illustrates an example of focus position shift of the B and R wavelengths with reference to the G wavelength. As illustrated in FIG. 7, the focus position of the B wavelength and that of the R wavelength are shifted in the opposite directions with reference to the focus position of the G wavelength.

The control unit 207 of the embodiment controls the lighting 208 so that the lighting 208 emits illumination light of the respective wavelengths. The control unit 207 obtains images captured by the imaging device 205 under irradiation of the illumination light of the respective wavelengths. The images at the different focus positions can thus be obtained without moving the lenses.

In the embodiment, the lighting 208 emits illumination light of one or more wavelengths designated from among the multiple wavelengths. Accordingly, it is possible to control the lighting 208 so as to emit illumination light which yields appropriate contrast as illustrated in FIG. 2. Therefore, an undesirable situation, which can occur when, for example, natural light is used, that effective extension of depth of field fails due to variation in contrast among wavelengths can be avoided.

The lighting 208 may emit illumination light of a single wavelength or, alternatively, emit illumination light of multiple wavelengths simultaneously. Put another way, the control unit 207 controls the lighting 208 so as to emit illumination light of one or more wavelengths among the multiple wavelengths.

Figure 8:
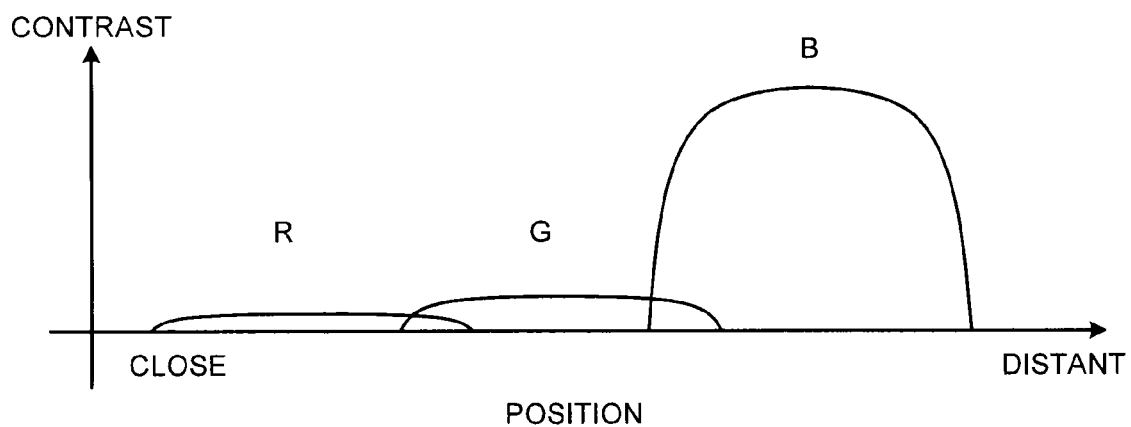
FIG. 8 is a diagram illustrating an example of contrast in images captured under irradiation with illumination light of R wavelength, that of G wavelength, and that of B wavelength.

The control unit 207 can determine the position of the object 201 by irradiating the object 201 with illumination light of multiple different wavelengths and specifying a position corresponding to a wavelength that provides higher contrast than the other wavelengths of the multiple different wavelengths. FIG. 8 is a diagram illustrating an example of contrast in images captured under irradiation with illumination light of the R wavelength, that of the G wavelength, and that of the B wavelength. In the example illustrated in FIG. 8, the contrast maximizes under irradiation of the illumination light of the B wavelength. Accordingly, the control unit 207 can determine that the object 201 is present at the position corresponding to the peak of the B wavelength.

The control unit 207 may switch the wavelength so that a focused image can be captured. For instance, when contrast in an image captured using illumination light of one wavelength is equal to or lower than a preset threshold, the control unit 207 may control the lighting 208 to emit illumination light of another wavelength. This control makes it possible to obtain a more-focused image when a defocused image is captured by changing wavelength of illumination light to another wavelength.

Sensitivity of the imaging device 205 can vary depending on wavelength. To take this into account, the control unit 207 may provide control for changing an exposure time of illumination light depending on the wavelength. For example, when an imaging device exhibiting high sensitivity to the G wavelength is used as the imaging device 205, the control unit 207 may preferably reduce an exposure time of illumination light of the G wavelength shorter than that of the other wavelengths. This control leads to reduction in variation in contrast at different wavelengths.

The control unit 207 may cause illumination light of multiple wavelengths to be emitted simultaneously, so that processing time can be reduced. For example, the control unit 207 may control the lighting 208 so as to irradiate the object 201 with illumination light of the R wavelength, that of the G wavelength, and that of the B wavelength simultaneously. Although this control can decrease accuracy when compared with control for emitting light of the respective wavelengths in a time division fashion, processing time can be reduced. When the lighting 208 is controlled to emit illumination light of the multiple wavelengths simultaneously, the image processing unit 206 may apply image processing associated with one wavelength, which is closest to an average wavelength of the multiple wavelengths, of the multiple wavelengths. For instance, if the R, G, and B wavelengths are 700 nm, 546.1 nm, and 435.8 nm, respectively, the image processing unit 206 may apply image processing associated with the G wavelength.

As described above, according to the embodiment, a lighting capable of emitting illumination light of one or more wavelengths designated from among multiple wavelengths can be used. Accordingly, depth of field can be extended efficiently.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An imaging system comprising:
   an optical system having different focus positions for different wavelengths of light;
   an optical element to extend depth of field of the optical system;
   a lighting to irradiate an object with illumination light of a wavelength that is designated from among multiple wavelengths;
   an imaging device to capture an image of the object that is irradiated with the illumination light and is formed by the optical system, and
   an image processing unit to switch image processing to be applied to the captured image in accordance with the wavelength of the illumination light with which the lighting irradiates the object.

2. The imaging system according to claim 1, wherein the optical system has the different focus positions for different wavelengths due to axial chromatic aberration.

3. The imaging system according to claim 1, further comprising a control unit to cause the lighting to irradiate the object with illumination light of multiple different wavelengths and determine that the object is at a position corresponding to a wavelength providing highest contrast in the image captured by the imaging device among the multiple different wavelengths.

4. The imaging system according to claim 1, further comprising a control unit to cause the lighting to irradiate the object with illumination light of another wavelength when contrast in the image captured by the imaging device is equal to or lower than a threshold.

5. The imaging system according to claim 1, further comprising a control unit to cause the lighting to irradiate the object with illumination light in such a manner that an exposure time is changed depending on the wavelength.

6. The imaging system according to claim 1, the image processing unit to cause the lighting to irradiate the object with illumination light of multiple wavelengths and apply image processing associated with a wavelength close to an average wavelength of the multiple wavelengths.

7. The imaging system according to claim 1, wherein the optical system has the different focus positions for different wavelengths due to axial chromatic aberration.

8. The imaging system according to claim 1, further comprising a control unit to cause the lighting to irradiate the object with illumination light of multiple different wavelengths and determine that the object is at a position corresponding to a wavelength providing highest contrast in the image captured by the imaging device among the multiple different wavelengths, wherein
   the optical system has the different focus positions for different wavelengths due to axial chromatic aberration.

9. The imaging system according to claim 1, further comprising:
   a control unit to cause the lighting to irradiate the object with illumination light of multiple different wavelengths and determine that the object is at a position corresponding to a wavelength providing highest contrast in the image captured by the imaging device among the multiple different wavelengths.

10. The imaging system according to claim 1, further comprising:
    a control unit to cause the lighting to irradiate the object with illumination light of multiple different wavelengths and determine that the object is at a position corresponding to a wavelength providing highest contrast in the image captured by the imaging device among the multiple different wavelengths, wherein
    the optical system has the different focus positions for different wavelengths due to axial chromatic aberration.

11. The imaging system according to claim 1, further comprising a control unit to cause the lighting to irradiate the object with illumination light of another wavelength when contrast in the image captured by the imaging device is equal to or lower than a threshold, wherein
    the optical system has the different focus positions for different wavelengths due to axial chromatic aberration.

12. The imaging system according to claim 1, further comprising:
    a control unit to cause the lighting to irradiate the object with illumination light of another wavelength when contrast in the image captured by the imaging device is equal to or lower than a threshold.

13. The imaging system according to claim 1, further comprising:

a control unit to cause the lighting to irradiate the object with illumination light of multiple different wavelengths and determine that the object is at a position corresponding to a wavelength providing highest contrast in the image captured by the imaging device among the multiple different wavelengths a control unit to cause the lighting to irradiate the object with illumination light of another wavelength when contrast in the image captured by the imaging device is equal to or lower than a threshold.

14. The imaging system according to claim 1, further comprising:
   a control unit to cause the lighting to irradiate the object with illumination light of another wavelength when contrast in the image captured by the imaging device is equal to or lower than a threshold, wherein
   the optical system has the different focus positions for different wavelengths due to axial chromatic aberration.

15. The imaging system according to claim 1, further comprising a control unit to cause the lighting to irradiate the object with illumination light in such a manner that an exposure time is changed depending on the wavelength, wherein
   the optical system has the different focus positions for different wavelengths due to axial chromatic aberration.

16. The imaging system according to claim 1, further comprising:
   a control unit to cause the lighting to irradiate the object with illumination light in such a manner that an exposure time is changed depending on the wavelength.

17. The imaging system according to claim 1, the image processing unit to cause the lighting to irradiate the object with illumination light of multiple wavelengths and apply image processing associated with a wavelength close to an average wavelength of the multiple wavelengths, wherein
   the optical system has the different focus positions for different wavelengths due to axial chromatic aberration.

18. The imaging system according to claim 1, further comprising:
   an image processing unit to cause the lighting to irradiate the object with illumination light of multiple wavelengths and apply image processing associated with a wavelength close to an average wavelength of the multiple wavelengths.

19. The imaging system according to claim 1, wherein the optical element includes a phase plate spreading a point spread function, and the image processing unit deconvolutes the point spread function spread by the phase plate.

20. The imaging system according to claim 19, wherein the optical system includes an aperture located adjacent the phase plate.

* * * * *